(12) United States Patent
Harter et al.

(10) Patent No.: US 9,156,335 B1
(45) Date of Patent: Oct. 13, 2015

(54) STRUCTURAL DOOR HANDLE ATTACHED TO DOOR STRUCTURE AT THE DOOR WINDOW BELT

(71) Applicant: Ford Global Technologies, LLC, Dearborn, MI (US)

(72) Inventors: Floyd Anthony Harter, Saint Clair, MI (US); Lohitha Dewasurendra, Canton, MI (US); Eric Elliott, Canton, MI (US); Rajesh K. Patel, Farmington Hills, MI (US); Chester Stanislaus Walawender, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/302,674

(22) Filed: Jun. 12, 2014

(51) Int. Cl.
*B60J 5/00* (2006.01)
*B60J 5/04* (2006.01)
*E05F 11/54* (2006.01)

(52) U.S. Cl.
CPC ............. *B60J 5/0434* (2013.01); *E05F 11/54* (2013.01)

(58) Field of Classification Search
CPC ................................. B60J 5/0434; E05F 11/54
See application file for complete search history.

(56) References Cited

U.S. PATENT DOCUMENTS

| 4,703,963 | A | 11/1987 | Ball |
| 4,867,501 | A | 9/1989 | Nomura et al. |
| 8,162,360 | B2 | 4/2012 | Takaya et al. |
| 8,451,087 | B2 | 5/2013 | Krishnan et al. |
| 2010/0235057 | A1 | 9/2010 | Papanikolaou et al. |
| 2014/0000165 | A1 | 1/2014 | Patel et al. |

FOREIGN PATENT DOCUMENTS

JP       2013-100026       5/2013

*Primary Examiner* — Lori L Lyjak
(74) *Attorney, Agent, or Firm* — Jason Rogers; Price Heneveld LLP

(57) ABSTRACT

A vehicle door and handle assembly includes inner and outer panels defining an inner door cavity therebetween. A belt reinforcement is disposed within the inner door cavity and includes a generally upright body portion having an upper edge. A belt molding is partially disposed on the upper edge of the belt reinforcement. A casting bracket includes downwardly extending reinforcement members and a handle portion interconnecting opposite ends. Each reinforcement member includes upper and lower mounting features, wherein the upper mounting features are supported on the upper edge of the belt reinforcement and the lower mounting features are mounted on the body portion of the belt reinforcement. A cover substantially covers the casting bracket and is configured to align with the belt molding on the upper edge of the belt reinforcement to define an integrated belt molding at the door window belt.

20 Claims, 8 Drawing Sheets

STRUCTURAL DOOR HANDLE ATTACHED TO DOOR STRUCTURE AT THE DOOR WINDOW BELT

FIELD OF THE INVENTION

The present invention generally relates to a door handle assembly, and more particularly, to a belt integrated door handle as used in connection with a side door of a vehicle.

BACKGROUND OF THE INVENTION

Conventional door handles use a door chassis to support a handle structure. When supporting a handle structure from the door chassis, several packaging constraints are realized at a belt reinforcement due to moving glass assemblies and other like features disposed within a door cavity. These packaging constraints, along with class A surface demands, generally drive the position of such a handle to a lower point along an outer panel of the vehicle door, thereby disrupting a smooth body side surface theme. Further, these packaging constraints at the belt reinforcement also prevent the use of a standard handle chassis. Further, current exterior handles are generally mechanical and require a moving handle strap which moves in relation to a fixed bezel. These mechanical handles generally include complex mechanisms and are known to bind against a fixed bezel and also carry concerns as to deformation related to actuation of the handle which may require several counter measures for reinforcing a mechanical handle which significantly add to the overall costs of the handle assembly. Thus, a door handle which is coupled directly to the door structure is desired, wherein the door handle is fixed and configured to withstand customer applied loads on the handle in both vertical and horizontal directions. Further, a door handle that is integrated into the belt molding of a vehicle door is desired for clean and highly stylized door design that effectively supports door opening efforts without a conventional handle chassis.

SUMMARY OF THE INVENTION

One aspect of the present invention includes a vehicle door and handle assembly, wherein the vehicle door includes inner and outer panels defining an inner door cavity therebetween. A belt reinforcement is disposed within the inner door cavity and includes a generally upright body portion having an upper edge. A belt molding is partially disposed on the upper edge of the belt reinforcement. A casting bracket includes opposite ends with reinforcement members downwardly extending from the opposite ends and a handle portion interconnecting the opposite ends. Each reinforcement member includes upper and lower mounting features, wherein the upper mounting features are supported on the upper edge of the belt reinforcement and the lower mounting features are mounted on the body portion of the belt reinforcement. A cover substantially covers the casting bracket and is configured to align with the belt molding on the upper edge of the belt reinforcement.

Another aspect of the present invention includes a door handle assembly for a vehicle door having a casting bracket which includes a handle portion. The handle portion includes opposite ends having downwardly extending reinforcement members. Each reinforcement member includes upper and lower mounting features disposed thereon. A belt reinforcement is disposed within a cavity of the vehicle door and includes a body portion and an upper edge. The body portion is coupled to the lower mounting features of the casting bracket and the upper edge abuttingly supports the upper mounting features of the casting bracket.

Yet another aspect of the present invention includes a door handle assembly for a vehicle door having a belt reinforcement, wherein the door handle assembly includes a casting bracket. The casting bracket includes a handle portion with opposite ends having downwardly extending reinforcement members. Each reinforcement member includes upper and lower mounting features, such that the upper mounting features are supported on an upper edge of the belt reinforcement and the lower mounting features are mounted on a body portion of the belt reinforcement. A belt molding is partially disposed over the upper edge of the belt reinforcement, and a cover substantially covers the casting bracket and is configured to align with the belt molding on the upper edge of the belt reinforcement.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
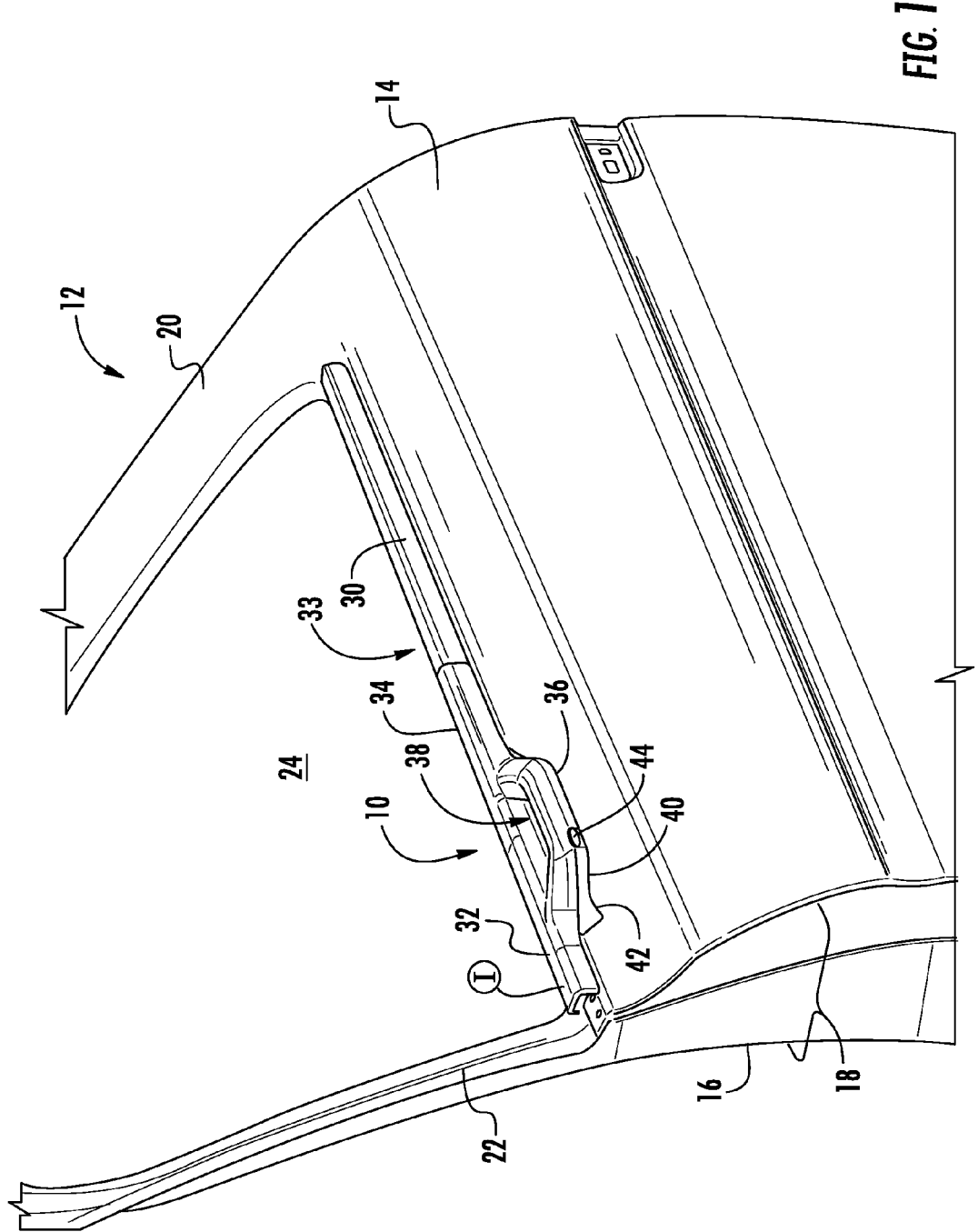
FIG. 1 is a top perspective view of a vehicle door having a door handle assembly mounted thereon.

For purposes of description herein, the terms "upper," "lower," "right," "left," "rear," "front," "vertical," "horizontal," and derivatives thereof shall relate to the present disclosure as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, the reference numeral 10 generally designates a door handle assembly of the present invention, according to one embodiment, as coupled to a vehicle door 12. The vehicle door 12 includes an outer panel 14 and an inner panel 16 which define an inner door cavity 18 therebetween. The vehicle door 12 further includes an A-column portion 20 and a B-column portion 22. Thus, in the configuration shown in FIG. 1, the vehicle door 12 may be a passenger side vehicle door with a daylight opening 24 disposed between the A-column portion 20 and B-column portion 22. The vehicle door 12 further includes a belt molding 30 disposed below and adjacent to the daylight opening 24. The belt molding 30 is configured to conceal an upper edge of a belt reinforcement member disposed within the inner cavity 18 of the vehicle door 12, as further described below. The door handle assembly 10 generally includes a cover 32 which substantially covers an inner portion 34 and a handle portion 36 of the door handle assembly 10. As shown in FIG. 1, the handle portion 36 is spaced outwardly from the inner portion 34, thereby defining a spacing 38 which is configured to allow a user to grasp the handle portion 36 of the door handle assembly 10. At location I, as shown in FIG. 1, the cover 32 has a generally inverted U-shaped cross-section which is configured to mirror, or otherwise compliment, the cross-section of the belt molding 30, thereby integrating the door handle assembly 10 to the belt molding 30 for a seamless aesthetic appearance at the door window belt 33. As further shown in FIG. 1, the door handle assembly 10 includes a lower housing 40 having gusseted portions 42, such that the lower housing 40 supports the door handle assembly 10 at the gusseted portions 42 against the outer panel 14 of the vehicle door 12. As further described below, the gusseted portions 42 help to reinforce the door handle assembly 10, particularly at the handle portion 36, from user applied loads in both vertical and horizontal directions.

The handle portion 36 of the door handle assembly 10 is a fixed handle portion, such that the door handle assembly 10 of the present invention does not include the costly mechanical mechanisms of conventional door handle assemblies, and further does not require a standard handle chassis for proper operation. Instead, it is contemplated that a sensor is disposed within the door handle assembly 10 at a location, such as the handle portion 36, that is capable of sensing the approach of a user having a corresponding key fob to the vehicle on which the door handle assembly 10 is coupled. Further, the sensor can sense when a user's hand is inserted in the spacing 38 between the inner portion 34 and handle portion 36, such as when the user grasps the handle portion 36. The sensor is generally an electric sensor which is configured to activate a latch mechanism for latching and unlatching the vehicle door 12 to a vehicle frame, and is also configured to operate an light emitting diode (LED) illumination source for lighting the area in and around the door handle assembly 10. The sensor incorporated into the door handle assembly 10 may be substantially the same as any one of the sensors disclosed in U.S. patent application Ser. No. 13/608,303 entitled "FLUSH-MOUNTED DOOR HANDLE FOR VEHICLES" (U.S. Patent Application Publication No. 2014/0000165), and the power latch used in conjunction with the door handle assembly 10 may be substantially the same as the latches disclosed in U.S. patent application Ser. No. 12/402,744 entitled "UNIVERSAL GLOBAL LATCH SYSTEM" (U.S. Patent Application Publication No. 2010/0235057), the entire contents of each of these applications being incorporated herein by reference. The operation and location of a switch and sensor mechanisms is further described below with reference to FIG. 8. An actuator button 44 is further disposed on handle portion 36 of cover 32 and can be used to actuate an associated latching mechanism or lock feature.

Figure 2:
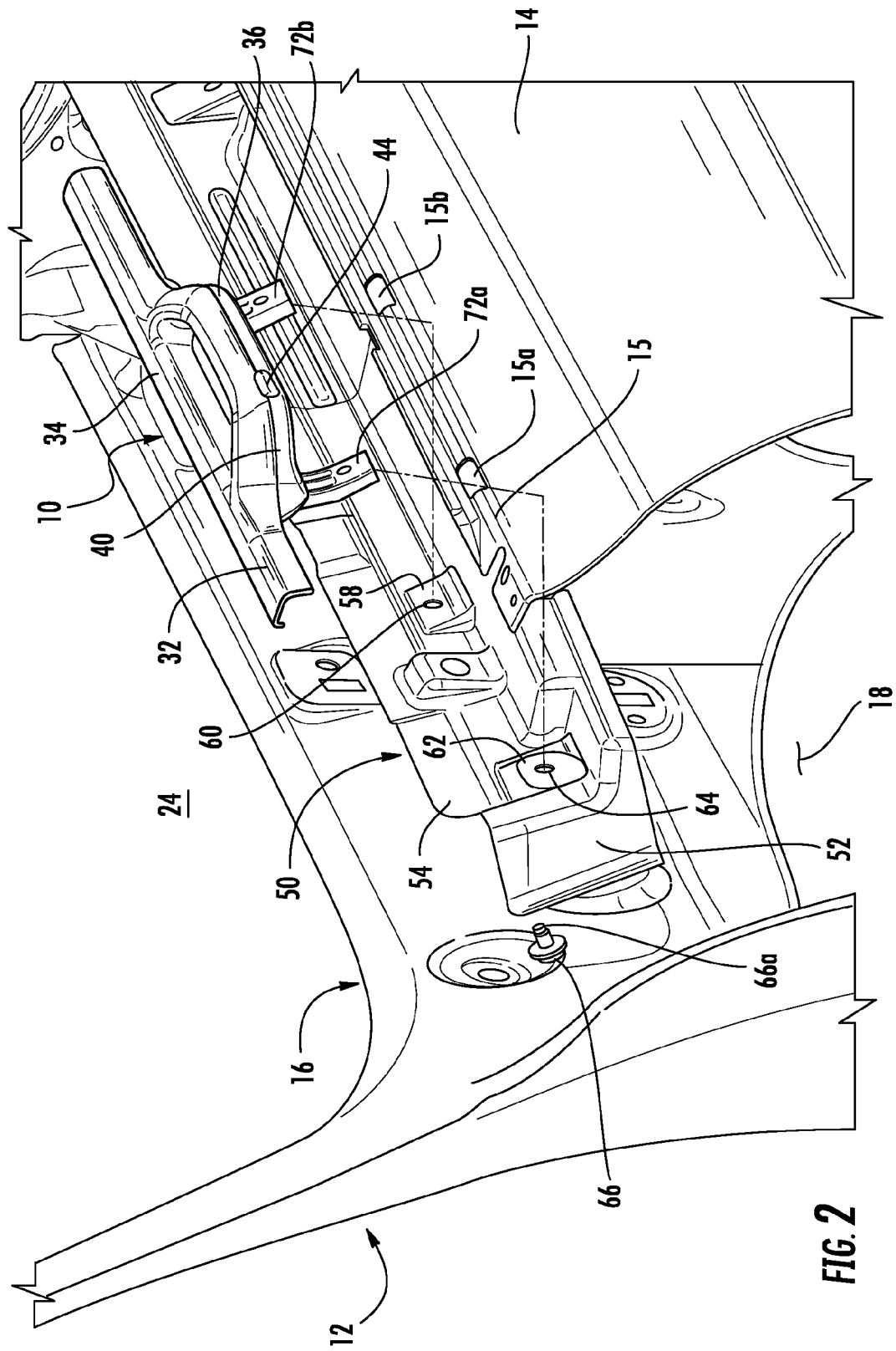
FIG. 2 is a top exploded view of the vehicle door and door handle assembly of FIG. 1.

Referring now to FIG. 2, the outer panel 14, which defines an exterior of the vehicle door 12, is shown exploded away from the inner panel 16, thereby revealing a belt reinforcement 50 disposed within the vehicle door cavity 18. The belt reinforcement 50 includes a substantially vertical or upright body portion 52 having an upper edge 54 which generally runs the length of the body portion 52. The body portion 52 further includes mounting tabs 58, 62 angled outwardly from the generally upright or vertical body portion 52 having mounting apertures 60, 64, respectively. As further shown in FIG. 2, fasteners 66 can be used to couple the door handle assembly 10 to the belt reinforcement 50 at mounting tabs 58, 62 through mounting apertures 60, 64, as further described below.

As further shown in FIG. 2, the door handle assembly 10 includes downwardly extending reinforcement members 72a, 72b which are configured to be received through receiving notches 15a, 15b disposed on a belt shelf 15 of the outer panel 14 as shown by the dotted lines in FIG. 2. The reinforcement members 72a, 72b are then coupled to the belt reinforcement 50 at mounting tabs 58, 62 as further described below.

Figure 3:
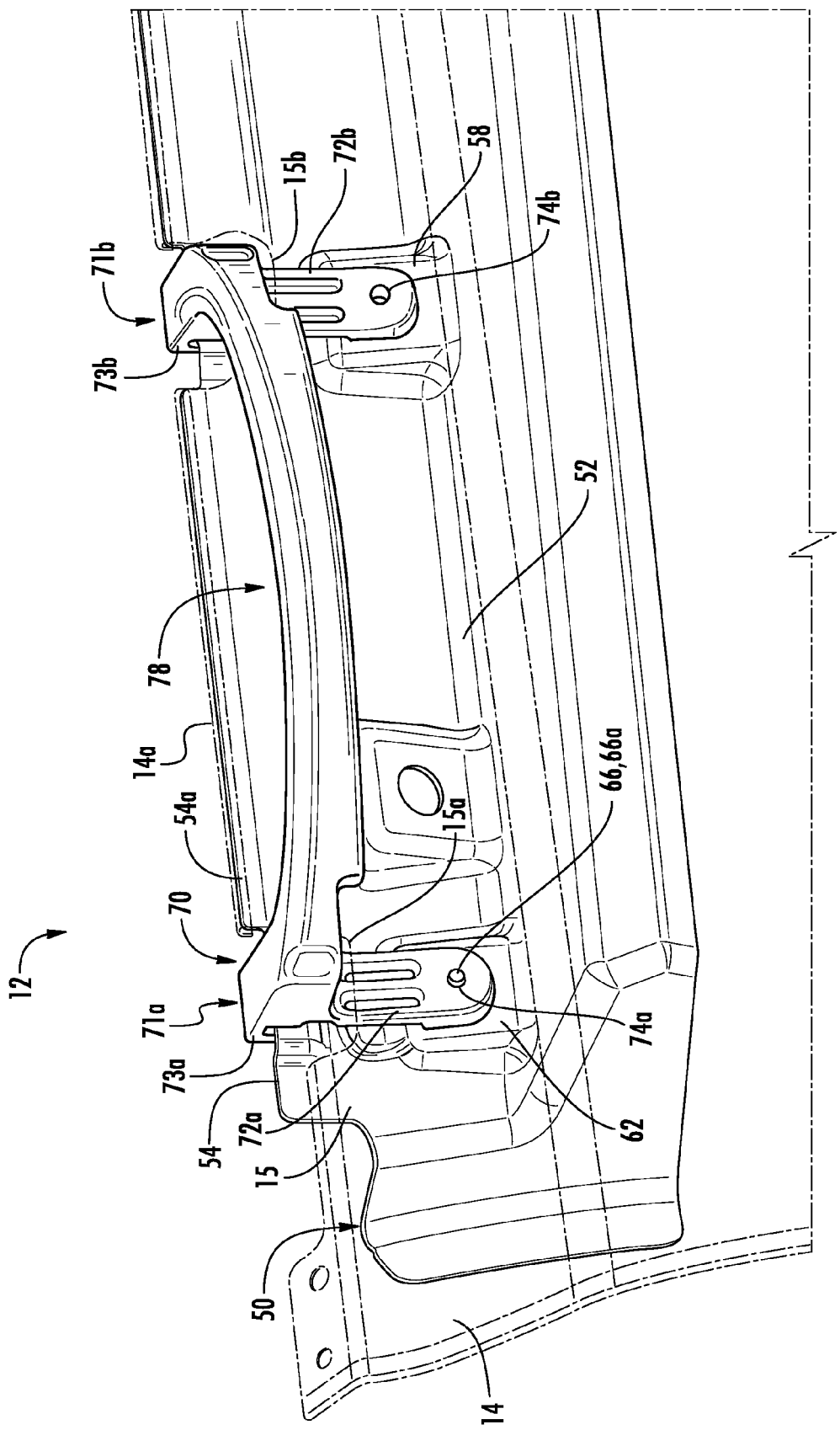
FIG. 3 is a perspective view of a casting bracket coupled to a belt reinforcement with an outer panel of the vehicle door shown in phantom.
Figure 4:
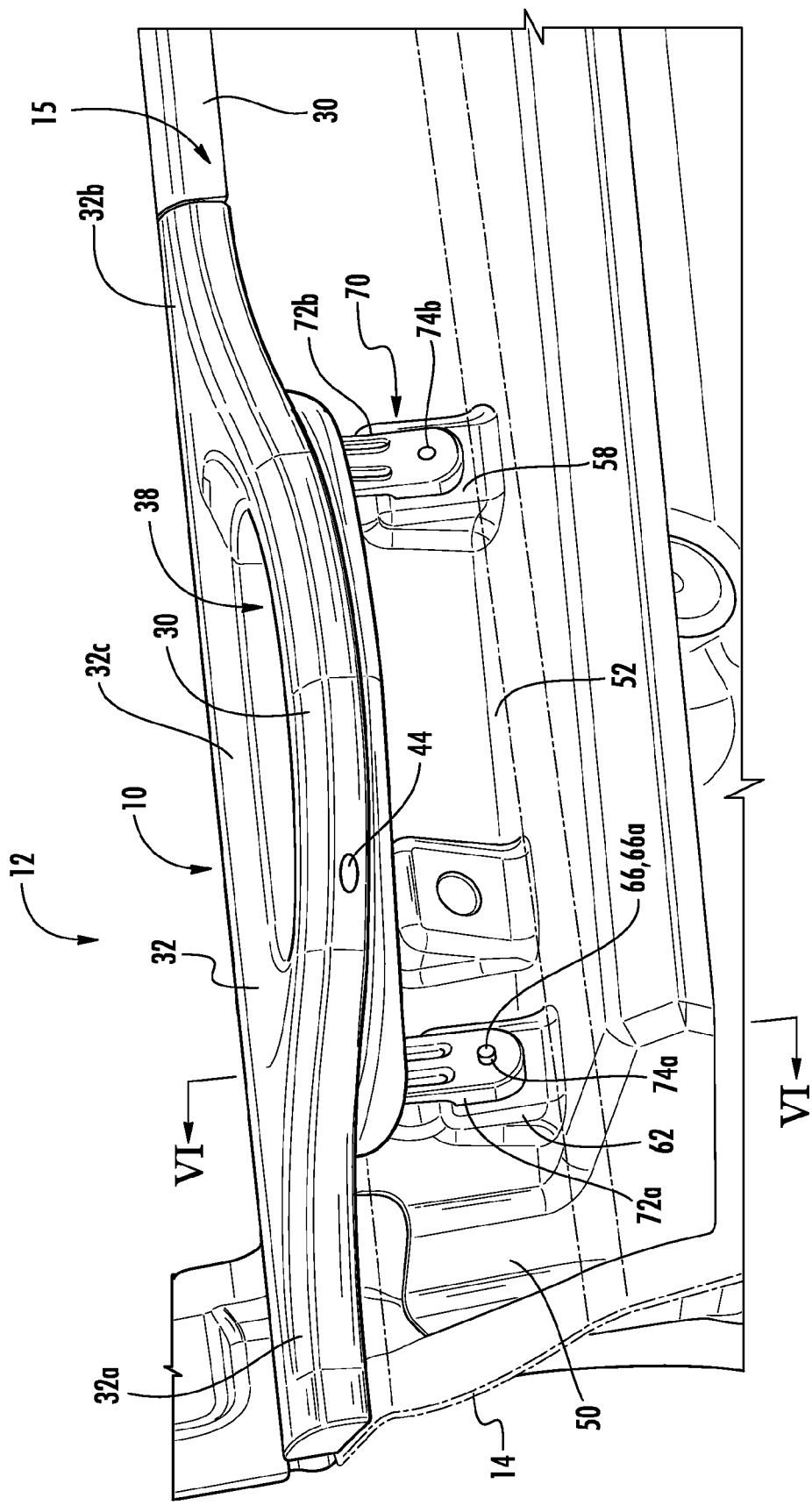
FIG. 4 is a perspective view of the casting bracket of FIG. 3.

Referring now to FIG. 3, the cover 32, shown in FIG. 2, has been removed to reveal a casting bracket 70 having opposite ends 71a, 71b from which the reinforcement members 72a, 72b downwardly extend, respectively. The reinforcement members 72a, 72b are essentially mirror images of one another and are used to couple the casting bracket 70 to the belt reinforcement 50. Specifically, the casting bracket 70 includes upper mounting features 73a, 73b which define hook members disposed over and around the upper edge 54 of the belt reinforcement 50 at the opposite ends 71a, 71b of the casting bracket 70. In this way, the upper mounting features 73a, 73b are abuttingly supported on the upper edge 54 of the belt reinforcement 50. Lower mounting features 74a, 74b, shown in FIG. 3 in the form of mounting apertures which may be threaded apertures, are disposed on lower portions of the reinforcement members 72a, 72b and are each configured to receive fastener 66 shown specifically on reinforcement member 72a in FIG. 3. Thus, as shown in FIG. 2 and FIG. 3, the fastener 66 is configured to be inserted from the inner panel side of the vehicle door 12 through mounting aperture 65 disposed on mounting tab 62 of the belt reinforcement 50. The fastener 66, as shown in FIG. 2, has a threaded end 66a which then threadingly engages into lower mounting feature 74a to couple reinforcement member 72a to the mounting tab 62 disposed on the body portion 52 of the belt reinforcement 50. Thus, it is contemplated that a similar fastener is used with mounting aperture 74b for coupling reinforcement member 72b, at a lower portion thereof, to mounting tab 58 disposed on the body portion 52 of the belt reinforcement 50. It is further contemplated that tool access may be available on inner panel 16 for coupling the casting bracket 70 to the belt reinforcement 50, as further described below with reference to FIG. 6. The casting bracket 70 further includes a handle portion 78 which interconnects opposite ends 71a, 71b. As shown in FIG. 3, the handle portion 78 extends outwardly from the opposite ends 71a, 71b of the casting bracket 70, such that the cover 32, as shown in FIG. 4, is configured to cover the handle portion 78 of the casting bracket 70, along with opposite ends 71a, 71b. Thus, the cover 32 substantially covers the casting bracket 70. As further shown in FIG. 3, the outer panel 14 includes a top coupling portion 14a which wraps around a raised portion 54a of the upper edge 54 of the belt reinforcement 50. In this way, the outer panel 14 is abuttingly supported on the raised portion 54a of the upper edge 54 of the belt reinforcement 50. As further shown in FIG. 3, the casting bracket 70 is coupled to both the body portion 52 and supported on the upper edge 54 of the belt reinforcement 50, such that the handle portion 78 is disposed generally outboard from the belt shelf 15 of the outer panel 14. The opposite ends 71a, 71b of the casting bracket 70 are substantially disposed on the belt shelf 15 adjacent to receiving notches 15a, 15b.

Referring now to FIG. 4, the door handle assembly 10 is shown with the cover 32 disposed thereon, wherein the cover 32 includes front and rear portions 32a, 32b having an intermediate portion 32c disposed therebetween. Essentially, the front portion 32a covers the casting bracket 70 near the reinforcement member 72a at end 71a. The rear portion 32b essentially covers the casting bracket 70 at opposite end 71b near reinforcement member 72b. The intermediate portion 32c covers the coupling portion 14a of the outer panel 14 as disposed on the raised portion 54a of upper edge 54 of the belt reinforcement 50 (best shown in FIG. 3). In this way, the front, rear and intermediate portions 32a, 32b and 32c of the cover 32 are configured to align with the belt molding 30 to define an integrated belt molding, such that the door handle assembly 10 has an integrated look as received on the belt shelf 15 of the outer panel 14 of the vehicle door 12 adjacent daylight opening 24.

Figure 5:
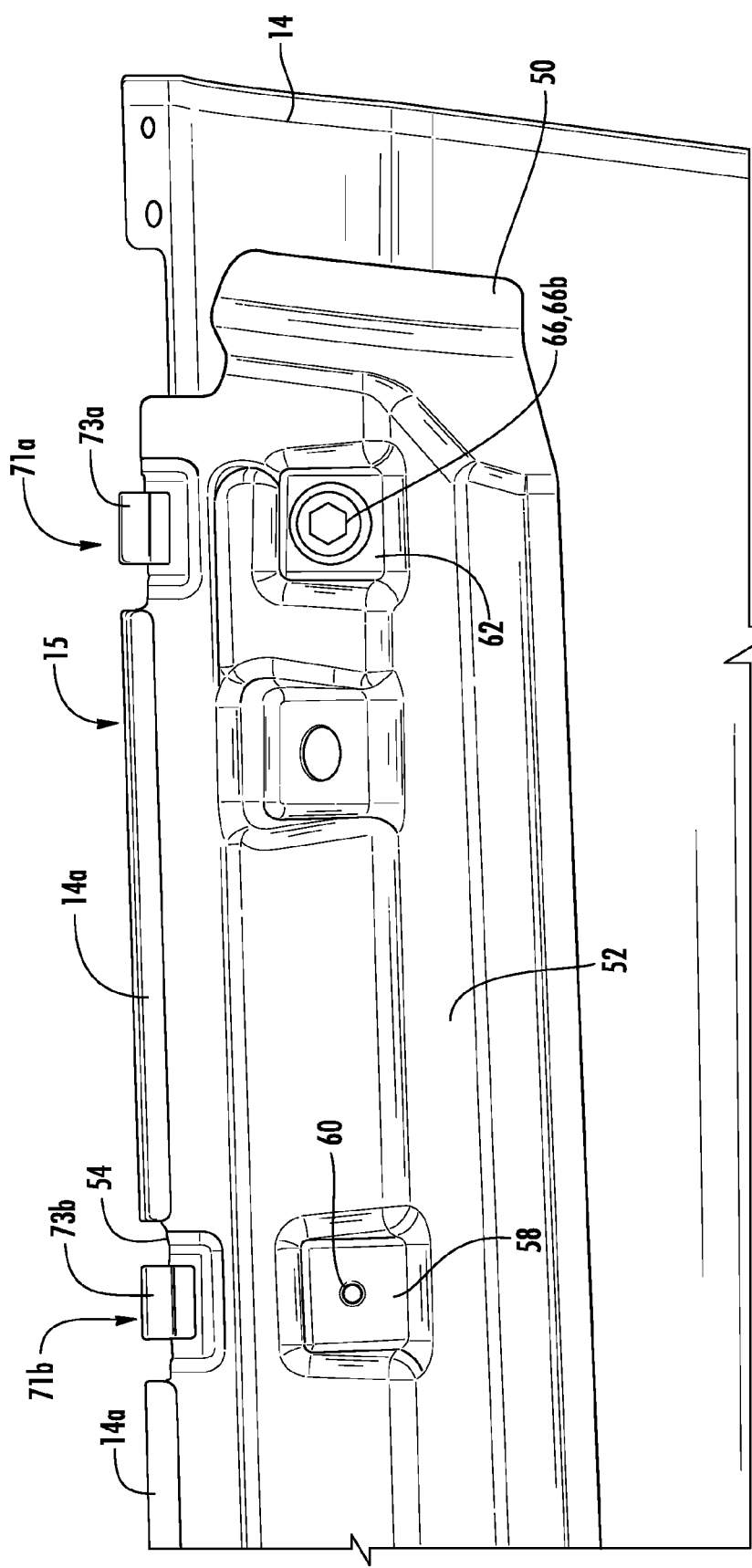
FIG. 5 is a rear perspective view of the vehicle door, casting bracket and belt reinforcement of FIG. 3.

Referring now to FIG. 5, the casting bracket 70 is shown from an interior view as coupled to the belt reinforcement 50. Specifically, as shown in FIG. 5, fastener 66 includes a head 66b which is mounted to mounting tab 62 disposed on the body portion 52 of the belt reinforcement 50. Mounting aperture 60 disposed on mounting tab 58 of the belt reinforcement 50 is also shown which is configured to receive a similar fastener as fastener 66 to couple the reinforcement members 72a, 72b to the body portion 52 of the belt reinforcement 50 as described above with reference to FIG. 3. The upper mounting features 73a, 73b are shown coupled around the upper edge 54 of the belt reinforcement 50, such that the first and second ends 71a, 71b of the casting bracket 70 are abuttingly supported on the upper edge 54 of the belt reinforcement 50. As further shown in FIG. 5, the coupling portion 14a is wrapped around the upper edge 54 of the belt reinforcement 50 such that the outer panel 14 is abuttingly supported on the belt reinforcement 50 as well, at or near the belt shelf 15.

Figure 6:
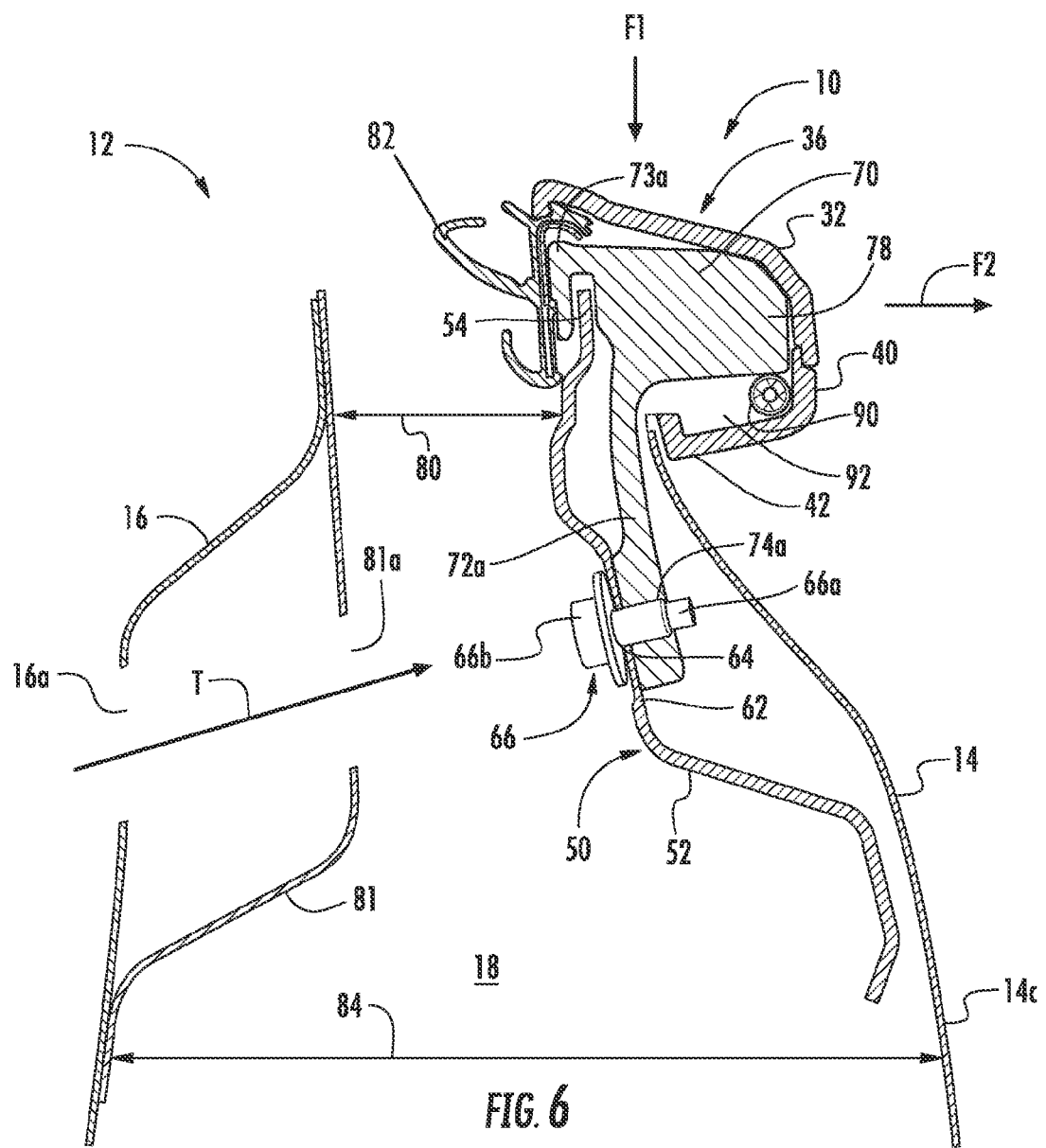
FIG. 6 is a cross-sectional view of the door handle assembly of FIG. 3 taken at line VI.

Referring now to FIG. 6, a cross section of the door handle assembly is shown which includes inner panel 16 and outer panel 14 defining a door cavity 18 therebetween, wherein belt reinforcement 50 is disposed. As shown in FIG. 6, reinforcement member 72a is coupled to the belt reinforcement 50 at the upper edge 54 by upper mounting features 73a and further coupled to the upright body portion 52 of the belt reinforcement 50 at lower mounting feature 74a via fastener 66.

As further shown in FIG. 6, a spacing 80 is shown disposed between a door ring frame reinforcement 81, which is coupled to the inner panel 16, and the belt reinforcement 50. This spacing 80 is configured to allow vertical movement of a window glass within the vehicle door 12 for opening and closing daylight opening 24 (FIG. 1). An outer belt seal 82 is shown disposed adjacent to the door handle assembly 10 which is used to seal against an incorporated window glass. Given that the spacing 80 is restricted, the door handle assembly 10 of the present invention is suitable for use within such packaging constraints. Other known door handle assemblies, having a conventional door handle chassis, would not allow for a door handle assembly mounted near the belt shelf 15, but would more likely be positioned on the outer panel 14 at location 14c as the spacing 84 between the door ring frame reinforcement 81 at location 14c is much greater and would allow for a conventional chassis to be used with a door handle while still allowing clearance for vertical movement of a window glass. Further, the fasteners used to couple the casting bracket 70 to the body portion 52 of the belt reinforcement 50, shown in FIG. 6 as fastener 66, are accessible through access apertures 16a and 81a disposed on the inner panel 16 and door ring frame reinforcement 81, respectively, along a path indicated by arrow T.

As further shown in FIG. 6, the lower housing 40 is connected to the cover 32 to fully surround the casting bracket 70, and a wire harness 90 is shown disposed within a cavity 92 created by the connection of the cover 32 and lower housing 40. The wire harness 90 is configured to provide power to an electronically driven latch system for use in conjunction with the door handle assembly 10. As shown in FIG. 6, the door handle assembly 10 is configured to handle loads indicated by arrows F1 and F2 which may act on the door handle assembly 10 by a user thereof. Forces in the vertical direction indicated by arrow F1 are supported on the belt reinforcement 50 at the upper edge 54 and at the reinforcement member 72a as coupled to the body portion 52 of the belt reinforcement 50. Lateral forces, indicated by arrow F2, are also realized at the upper edge 54 of the belt reinforcement 50 by the hook-shaped upper mounting member 73a as well as the fastening arrangement between the reinforcement member 72a and the body portion 52 of the belt reinforcement 50. Vertical forces indicated by arrow F1 are also countered by the gusseted portion 42 of lower housing 40 acting against the outer panel 14 of the vehicle door 12. The gusseted portion 42 abuts the outer panel 14 and prevents the cantilevered belt e-handle design from deflecting under normal or abusive usage loads realized in use. In this way, the door handle assembly 10 of the present invention consists of an internal structural core in the form of the casting bracket 70 having downwardly extending attachment legs, in the form of reinforcement members 72a, 72b, for structurally supporting the door handle assembly 10 at the window belt against loads imparted by a user.

Figure 7:
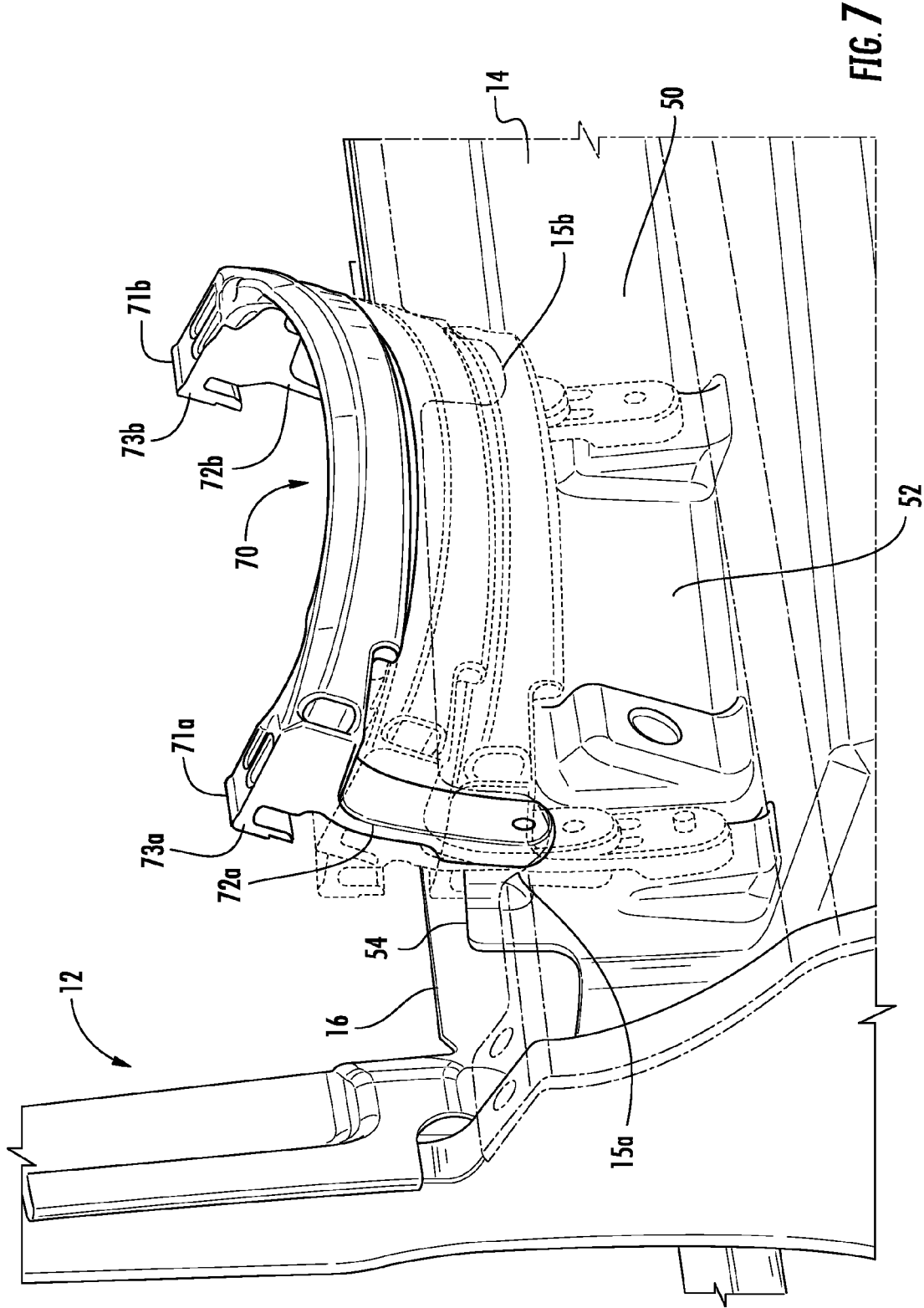
FIG. 7 is a perspective view showing relative movement of the casting bracket as positioned on an upper edge of the belt reinforcement.

Referring now to FIG. 7, the casting bracket 70 is shown being installed on the vehicle door 12 at the belt reinforcement 50, wherein the casting bracket 70 is installed through receiving notches 15a, 15b, better shown in FIG. 2, which are disposed on the outer panel 14. The reinforcement members 72a, 72b of the casting bracket 70 are inserted through the notches 15a, 15b and the casting bracket 70 is then rotated, as shown in phantom, to align the reinforcement members 72a, 72b with the upright body portion 52 of the belt reinforcement 50 for coupling thereto. As the casting bracket 70 is rotated, the upper mounting features 73b, in the form of hook-shaped members, align with the upper edge 54 and the casting bracket 70 is pressed downward, such that the upper coupling members 73b are coupled to and supported on the upper edge 54 of the belt reinforcement 50 for further supporting the casting bracket 70 thereon.

Figure 8:
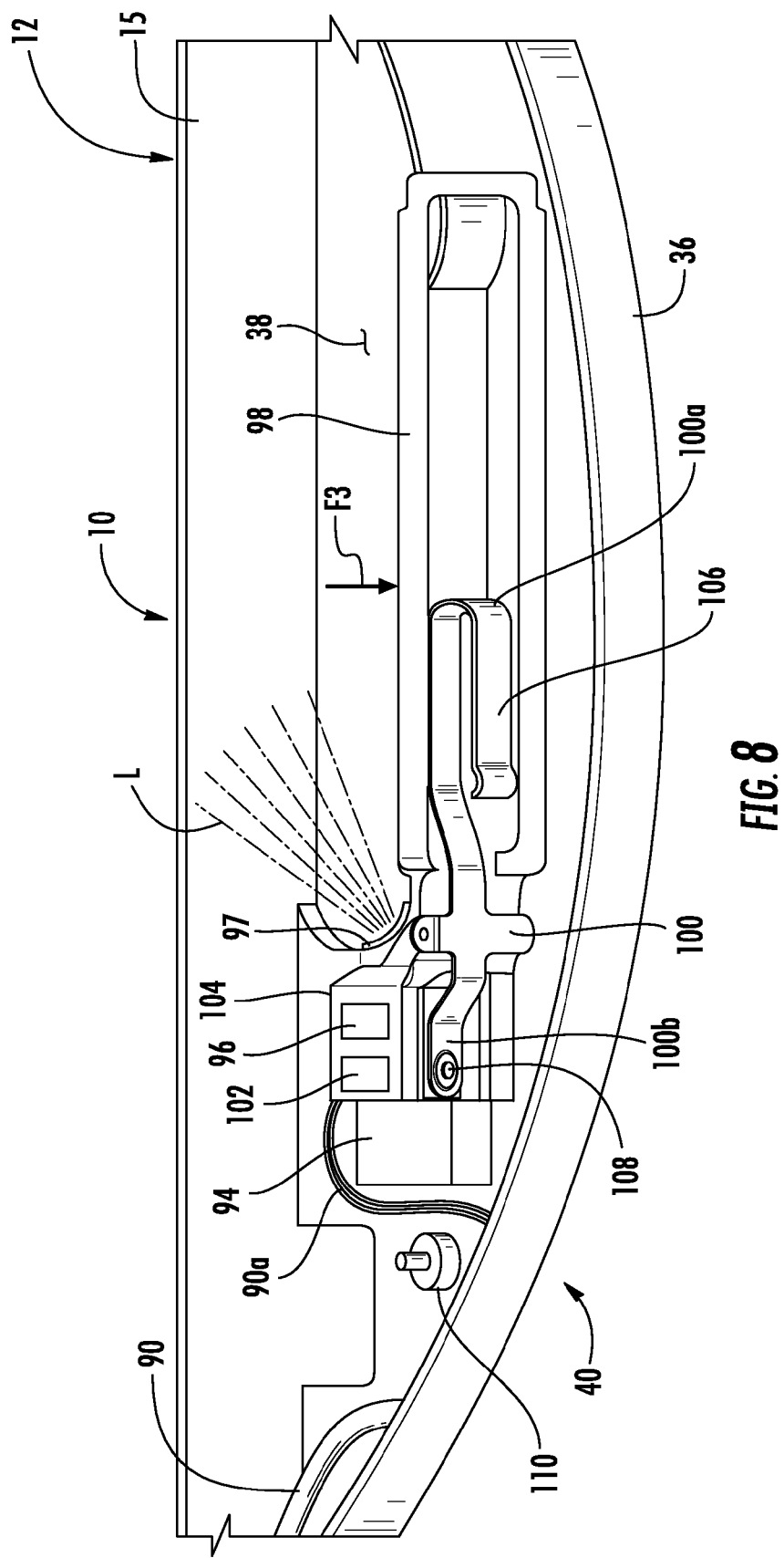
FIG. 8 is a top perspective view of the door handle assembly with a cover removed.

Referring now to FIG. 8, the door handle assembly 10 is shown with the cover 32 and the casting bracket 70 removed to reveal the internal componentry of the door handle assembly 10. As shown, the lower housing 40 defines a portion of the cavity 92 which is fully defined by the connection of the cover 32 and lower housing 40 as shown in FIG. 6. Within cavity 92, the wire harness 90 provides power to a light engine 94 for powering a light source 96 via wires 90a. The light source 96 may be an LED light source, as described above, for lighting the spacing 38 as well as in and around the door handle assembly 10 as shown by lines L emanating from lens 97. A locating boss 110 is disposed on the lower housing 40 for assistance in locating the lower housing 40 to the cover 32 in assembly. An actuator button 98, which may be in the form of a rubberized membrane, is configured on the inner side of the handle portion 36, adjacent spacing 38. In use, the user touches the actuator button 98 to depress the actuator button 98 laterally in a direction indicated by arrow F3 away from the vehicle door 12. As actuated by the user, the actuator button 98 activates an actuator 100 which is configured to activate a microswitch 102 housed in a component housing 104. The actuator 100 is shown in FIG. 8 as a leaf spring and includes a first side 100*a* and a second side 100*b* and is capable of toggling between at-rest and activated positions. The first side 100*a* includes a biasing portion 106 which is configured to bias or otherwise return the actuator 100 to the at-rest position from the activated position. The second side 100*b* includes a plunger 108 which is configured to contact and activate the microswitch 102 in the activated position. In use, a controller is configured to unlatch a powered latch of the vehicle door 12 only if a user's hand is detected by capacitive sensors coincident with actuation of microswitch 102. The presence of a user's hand can be detected by the capacitive sensors. In this way, the door handle assembly 10 is a fixed door handle assembly having an actuator button 98 used to control the latching features of the vehicle door 12.

It will also be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who receive this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle door and handle assembly, comprising:
    inner and outer panels defining a cavity therebetween;
    a belt reinforcement disposed within the cavity, the belt reinforcement having an upright body portion with an upper edge;
    a belt molding partially disposed on the upper edge of the belt reinforcement;
    a casting bracket having opposite ends with reinforcement members downwardly extending therefrom and a handle portion interconnecting the opposite ends;
    upper and lower mounting features disposed on the casting bracket, wherein the upper mounting features are supported on the upper edge of the belt reinforcement and the lower mounting features are mounted on the body portion of the belt reinforcement; and
    a cover substantially covering the casting bracket and aligned adjacent to the belt molding on the upper edge of the belt reinforcement.

2. The vehicle door and handle assembly of claim 1, wherein the reinforcement members comprise first and second reinforcement members.

3. The vehicle door and handle assembly of claim 2, wherein the lower mounting features are disposed on the reinforcement members.

4. The vehicle door and handle assembly of claim 3, wherein the lower mounting features comprise threaded apertures.

5. The vehicle door and handle assembly of claim 4, wherein each threaded aperture threadingly receives a fastener which extends through a mounting aperture disposed on the body portion of the belt reinforcement.

6. The vehicle door and handle assembly of claim 5, wherein each fastener is accessible through the inner panel of the vehicle door.

7. The vehicle door and handle assembly of claim 6, wherein the upper mounting features comprise hook members configured to hook to the upper edge of the belt reinforcement.

8. The vehicle door and handle assembly of claim 1, wherein the upper mounting features comprise hook members configured to hook to the upper edge of the belt reinforcement.

9. The vehicle door and handle assembly of claim 1, wherein the outer panel includes a coupling portion which is supported on the upper edge of the belt reinforcement.

10. A door handle assembly for a vehicle door, comprising:
    a casting bracket including a handle portion with opposite ends having downwardly extending reinforcement members;
    upper and lower mounting features disposed on the casting bracket; and
    a belt reinforcement disposed within a cavity of the vehicle door having a body portion coupled to the lower mounting features of the casting bracket and an upper edge abuttingly supporting the upper mounting features of the casting bracket.

11. The door handle assembly of claim 10, including:
    a belt molding partially disposed on the upper edge of the belt reinforcement.

12. The door handle assembly of claim 11, including:
    a cover substantially covering the casting bracket and aligned adjacent to the belt molding on the upper edge of the belt reinforcement; and a lower housing coupled to the cover and having gusseted portions abutting an outer panel of the vehicle door.

13. The door handle assembly of claim 12, wherein the cover and belt molding assembly substantially cover the door handle assembly and the upper edge of the belt reinforcement to provide an integrated belt molding disposed adjacent to a daylight opening.

14. The door handle assembly of claim 13, wherein the lower mounting features comprise threaded apertures, wherein each threaded aperture threadingly receives a fastener extending through a mounting aperture disposed on the body portion of the belt reinforcement.

15. The door handle assembly of claim 14, wherein the upper mounting features comprise hook members configured to hook to the upper edge of the belt reinforcement.

16. A door handle assembly for a vehicle door having a belt reinforcement, the door handle assembly comprising:
a casting bracket including a handle portion with opposite ends having downwardly extending reinforcement members, each reinforcement member including upper and lower mounting features, wherein the upper mounting features are supported on an upper edge of the belt reinforcement and the lower mounting features are mounted on a body portion of the belt reinforcement;
a belt molding partially disposed over the upper edge of the belt reinforcement; and
a cover substantially covering the casting bracket and configured to align with the belt molding on the upper edge of the belt reinforcement.

17. The door handle assembly of claim 16, wherein the cover and belt molding assembly define an integrated belt molding disposed adjacent to a daylight opening of the vehicle door.

18. The door handle assembly of claim 16, wherein the vehicle door includes inner and outer panels and an inner door cavity disposed therebetween, the belt reinforcement disposed within the inner door cavity and the outer panel having notches configured to receive the reinforcement members therethrough.

19. The door handle assembly of claim 18, wherein the lower mounting features comprise threaded apertures, wherein each threaded aperture threadingly receives a fastener extending through a mounting aperture disposed on the body portion of the belt reinforcement.

20. The door handle assembly of claim 19, wherein the upper mounting features comprise hook members configured to hook to the upper edge of the belt reinforcement.

* * * * *